(12) United States Patent
Yi et al.

(10) Patent No.: US 6,201,913 B1
(45) Date of Patent: Mar. 13, 2001

(54) INTEGRATED OPTICAL POWER SPLITTER AND MANUFACTURING METHOD THEREFOR

(75) Inventors: Sang-yun Yi, Yongin; Jung-hwan Cho, Seoul; Woo-hyuk Jang, Yongin; Tae-hyung Rhee, Sungnam, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/186,360

(22) Filed: Nov. 5, 1998

(30) Foreign Application Priority Data

Nov. 6, 1997 (KR) .................................................. 97-58493

(51) Int. Cl.[7] .................................................... G02B 6/26
(52) U.S. Cl. ................................ 385/42; 385/22; 385/45; 385/48
(58) Field of Search .............................. 385/15, 22, 31, 385/39, 42–48

(56) References Cited

U.S. PATENT DOCUMENTS

| | | | | |
|---|---|---|---|---|
| 4,515,428 | * | 5/1985 | Findakly | 385/42 |
| 5,226,100 | * | 7/1993 | Maerz | 385/45 |
| 5,282,257 | * | 1/1994 | Ota | 385/46 |
| 5,586,209 | * | 12/1996 | Matsuura et al. | 385/45 |

* cited by examiner

Primary Examiner—Frank G. Font
Assistant Examiner—Sang H. Nguyen
(74) Attorney, Agent, or Firm—Robert E. Bushnell, Esq.

(57) ABSTRACT

In an optical power splitter for splitting input light into N equal optical waves, and a manufacturing method therefor, a main waveguide and (N−1) branched waveguides are arranged on one side or both sides of the main waveguide. The main waveguide and the (N−1) branched waveguides form a directional coupler. In each of the directional couplers, the branched waveguide has an appropriate phase mismatch, a proper coupling coefficient, and a suitable coupling length to output 1/N of input optical power in the main waveguide. In the optical power splitter, when the main waveguide is semicircular, a circular substrate can be effectively used when the optical power splitter is manufactured.

28 Claims, 4 Drawing Sheets

FIG. 1A *(Related Art)*
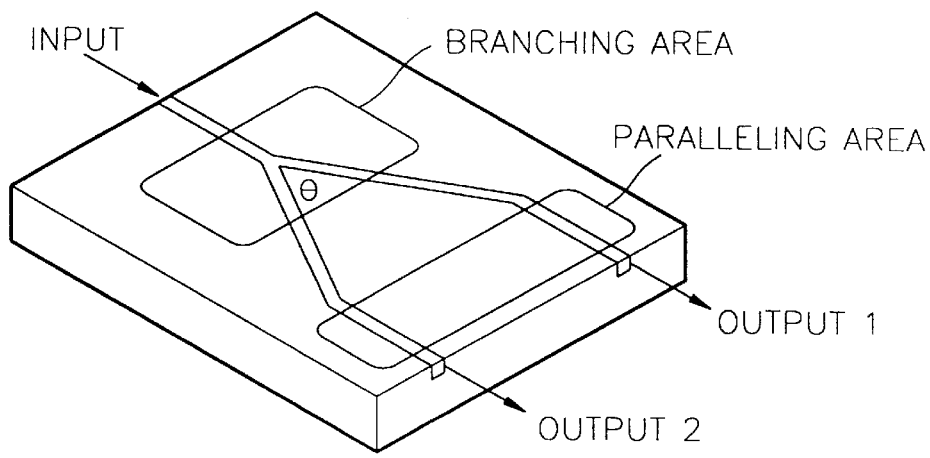
FIG. 1B *(Related Art)*
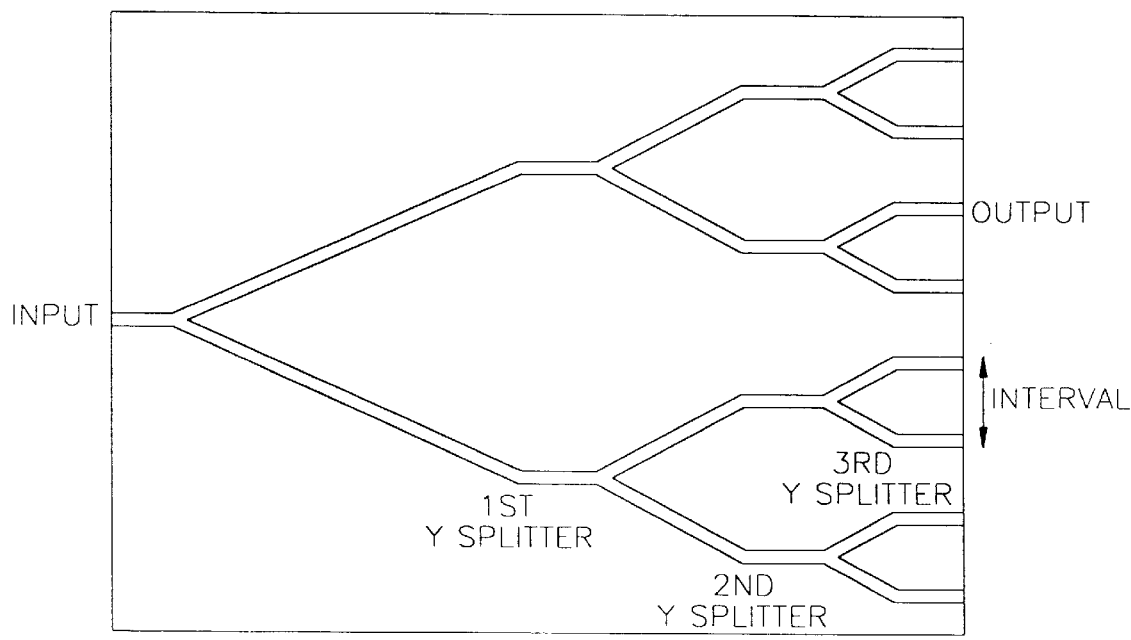

INTEGRATED OPTICAL POWER SPLITTER AND MANUFACTURING METHOD THEREFOR

CLAIM OF PRIORITY

This application makes reference to, incorporates the same herein, and claims all benefits accruing under 35 U.S.C. §119 from an application for INTEGRATED OPTICAL POWER SPLITTER AND MANUFACTURING METHOD THEREFOR earlier filed in the Korean Industrial Property Office on the 6$^{th}$ of Nov. 1997 and there duly assigned Ser. No. 58493/1997.

BACKGROUND OF THE INVENTION

1. Field of the Invention

The present invention relates to an optical power splitter for splitting an input light beam into N equal output light beams, and more particularly, to a simple and economic integrated optical power splitter by which waveguide loss as can be reduced using a directional coupler, and equal outputs can be obtained, and a manufacturing method therefor.

2. Description of the Related Art

An optical power splitter splits an optical signal into a plurality of optical signals, and is used as a key component of an optical subscriber network. An optical power splitter may be manufactured by thermally joining two optical fibers together or grinding the side surfaces of the optical fibers and attaching the ground side surfaces to each other. This optical fiber splitter is a "1×2 optical power splitter" which splits a signal into two signals. The 1×2 optical power splitters are cascaded to make N outputs, thus forming a 1×N optical power splitter. Here, $(2^{(logN/log2)}-1)$1×2 optical power splitters are required. However, the optical power splitter using optical fibers is difficult to manufacture and has big differences in characteristics between manufactured devices, thus making it difficult to obtain N equal outputs. Also, since one device has a large volume, the structure of a 1×N optical power splitter requires a large integration area. Accordingly, much research has been conducted in an attempt to solve the above problem. It is known that the most practical technique to manufacture an optical power splitter is to use an integrated optics technique.

The integrated optics technique integrates several optical devices on a substrate based on an optical waveguide. If the integrated optics technique is used, optical devices are easily arranged, and many functional devices can be interconnected to each other in a narrow area. Therefore, the manufacturing costs can be reduced. FIG. 1A is a perspective view of a 1×2 optical power splitter manufactured by the integrated optics technique. An input channel optical waveguide is divided into two in a Y-shaped branch area. A slanting waveguide is used in the branching area to space between output optical waveguides, and the slanting waveguide is changed into a linear waveguide in a paralleling area. The angle θ (hereinafter called a branched angle) between slanting optical waveguides is usually very small, e.g., less than 1°. The first reason why the branched angle is narrow is to reduce the scattering losses at the branching point. When a propagation path for optical waves is suddenly changed by the increase in the branched angle at the branching point, the optical waves cannot follow this path. As a result, larger scattering losses occur. The second reason is that in a 1×N optical power splitter constituted of cascaded 1×2 optical power splitters, if the branched angle is wide, the direction in which optical waves travel on the same phase surface is not consistent with the travel direction for the optical waveguide. In this case, an optical wave is biased in only one direction at the next branched point, so that equal division of 50:50 cannot be expected. FIG. 1B shows an example of a 1×8 optical power splitter formed by cascading 7 1×2 optical power splitters on a substrate. The 1×2 optical power splitters are connected to each other in a three-stage tree structure. On the first stage, input light is divided into two, on the next stage, the input light is divided into four outputs, and on the last stage, the input light is divided into eight outputs.

The length of a device is the most important feature in manufacturing the integrated 1×N optical power splitter. The length of the device is determined by the length of a branching region in each step of the 1×2 optical power splitter and the sum of the lengths of the paralleling regions. However, as described above, since the branched angle cannot be made small, the length of the device is determined by the length of the branching regions. In a 1×N optical power splitter consisting of slanting waveguides, the length of the device $L_N$ is expressed by the following Equation 1:

$$L_N = \frac{(N-1) \cdot S}{2\tan(\theta/2)} \quad (1)$$

wherein θ is a branched angle and an interval S is the distance between output waveguides.

It can be calculated from the Equation 1 that if the branched angle is 1°, then the length of a 1×32 optical power splitter having an S value of 250 μm is 444 mm. However, it is actually difficult to manufacture such a long optical waveguide. Also, it is difficult to prepare a substrate for manufacturing this long waveguide, and even though the long waveguide is manufactured, propagation losses are large, so that this is not practical. Accordingly, in order to reduce the length of the device, an S-shaped curved optical waveguide has been tried instead of the slanting optical waveguide used in the branching area. However, as mentioned above, the propagation direction for optical waves on the same phase surface must be consistent with the propagation direction for optical waveguides to obtain an equal optical power division ratio. Thus, the radius of curvature of the curved optical waveguide cannot be short, thus resulting in a long curved optical waveguide. Accordingly, even when the optical power splitter uses an S-shaped curved optical waveguide, it is eventually difficult to shorten the length of the device.

Such a 1×N optical power splitter has the following problems.

First, the preparation of a substrate for manufacturing a device is difficult because of a long device, and large propagation losses occur.

Second, uniformity of the outputs is lowered. That is, manufactured individual devices are not uniform spatially due to a large ratio of width to length (device length/device width), thus lowering the uniformity of N outputs.

Third, it is costly to manufacture the device. That is, the manufacturing costs are increased by the inefficient use of a substrate. Since a typical substrate for manufacturing an optical waveguide device is circular, many portions of the substrate are wasted when a long device is manufactured. Also, when a division ratio of optical power is changed by a defect of a 1×2 optic power splitter at an upper stage occurring on account of the tree structure, this effect is continuously transmitted to 1×2 optical power splitters at the lower stage. Accordingly, even a small defect on an optical waveguide directly causes large errors. Thus, the yield is lowered. Furthermore, a very accurate V-shaped pattern at a Y-shaped optical waveguide branching point must be formed to equally split optical power, thus requiring a high processing cost to manufacture the accurate V-shaped pattern.

SUMMARY OF THE INVENTION

To solve the above problems, it is an object of the present invention to provide an optical power splitter of a star structure using a directional coupler.

It is another object of the present invention to provide an optical power splitter which can reduce scattering losses and make an equal division ratio even by using a large branched angle to reduce the length of the optical power splitter.

It is still another object of the present invention to provide an optical power splitter by which uniformity is increased by making a ratio of width to length (device length/device width) small by reducing the length of the device, and residual nonuniformity guarantees output uniformity by using a directional coupler having a phase mismatch as a branched optical waveguide.

It is yet another object of the present invention to provide an optical power splitter by which a circular substrate can be effectively used by arranging optical waveguides in a semicircle shape and forming a device in a star structure, and the cost for mirror-surface finishing can be saved since the input and output mirror-surface finishing can be performed on only one surface because an input and an output are on the same surface when the optical power splitter is formed of a semicircle.

Accordingly, to achieve the first objective, there is provided a 1×N optical power splitter constituted of a main optical waveguide and (N−1) branched optical waveguides which are connected to each other in the structure of a directional coupler by using a star structure instead of a tree structure. The star structure has a simple shape and is easily designed, but uniformity of output optical power is poor. Accordingly, to overcome this problem, there is provided another 1×N optical power splitter which is different from the above 1×N optical power splitter using the star structure. The optical power splitter according to the present invention can equalize output optical power while having the merits of the star structure. For this, the optical power splitter according to the present invention is constituted of a main optical waveguide and (N−1) branched optical waveguides. Here, the main optical waveguide and the branched optical waveguides are coupled to each other in the structure of a directional coupler having a phase mismatch, such that input light propagates along the main optical waveguide and a predetermined amount of optical power is then coupled into each of the branched optical waveguides. For the directional coupler with a predetermined amount of phase mismatch, the maximum fraction of power that can be transferred to a branched waveguide is limited to a desired value, to thereby increase fabrication tolerances. Also, the optical power splitter in operation can reduce variation in optical power coupling with respect to a change in external conditions such as a ambient temperature. Each of the branched waveguides has an appropriate coupling coefficient and a proper coupling length to couple a predetermined amount of optical power from the main optical waveguide.

According to an aspect of the present invention, there is provided a 1×N optical power splitter comprising a main optical waveguide and (N−1) branched optical waveguides branched from the main optical waveguide, wherein the main optical waveguide and the branched optical waveguides are coupled to each other in the structure of a directional coupler to form an end of the main optical waveguide as an input port and the other end thereof as an output port and to form an end of each of the branched optical waveguides as an input port branched from the main optical waveguide and the other end thereof as another output port.

According to another aspect of the present invention, there is provided a method of manufacturing a 1×N optical power splitter comprising a main optical waveguide and (N−1) branched optical waveguides branched from the main optical waveguide, wherein the main optical waveguide and the branched optical waveguides are coupled to each other in the structure of a directional coupler to form an end of the main optical waveguide as an input port and the other end thereof as an output port and to form an end of each of the branched optical waveguides as an input port branched from the main optical waveguide and the other end thereof as another output port, the method comprising the steps of: (a) determining the refractive indices, widths and lengths of two optical waveguides coupled to each other in the directional coupler structure; (b) determining the coupling coefficient and the coupling length of the directional coupler structure; (c) determining the spacing between two optical waveguides of the directional coupler structure having a phase mismatch; and (d) arranging the main optical waveguide and the branched optical waveguides using the results determined through the above steps.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1A is a perspective view of a 1×2 optical power splitter based on a Y-branched optical waveguide;

FIG. 1B is a perspective view of a 1×8 optical power splitter based on a Y-branched optical waveguide;

DESCRIPTION OF THE PREFERRED EMBODIMENTS

Figure 2:
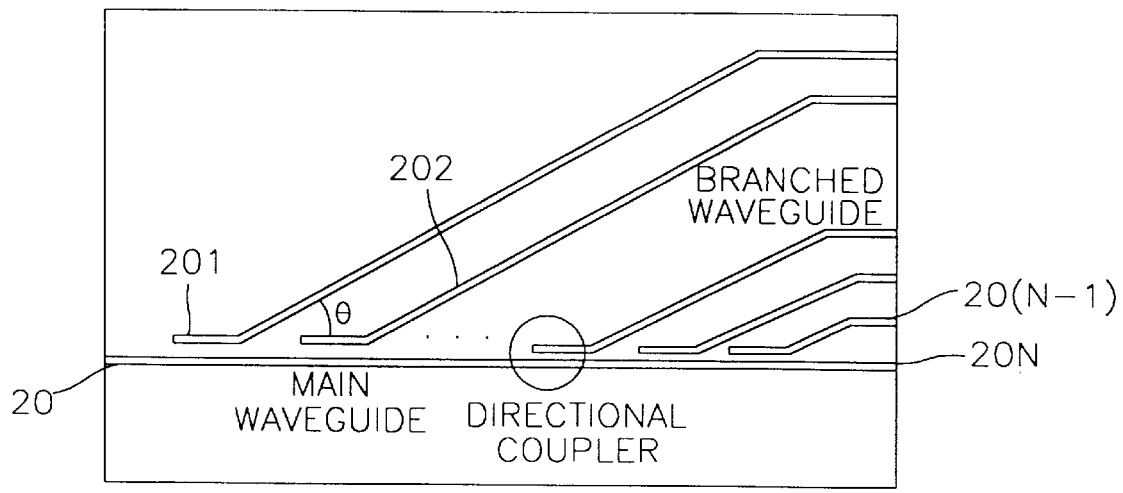
FIG. 2 shows a 1×N optical power splitter in which branched optical waveguides are arranged at one side of a main optical linear waveguide using a directional coupler, according to an embodiment of the present invention.
Figure 3:
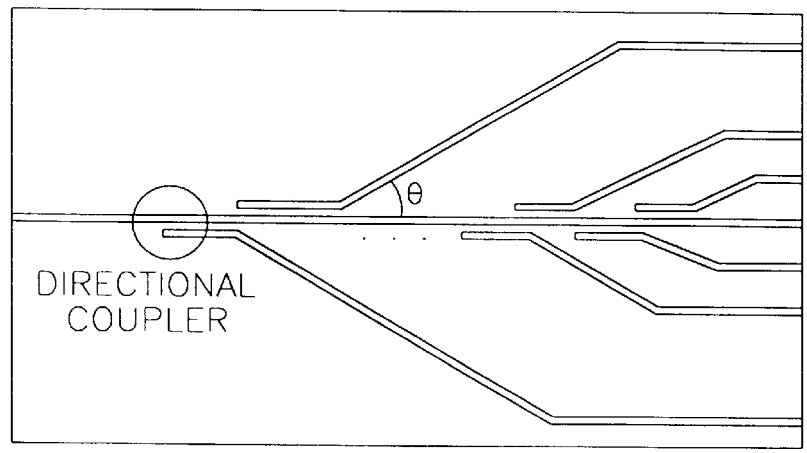
FIG. 3 shows a 1×N optical power splitter in which branched optical waveguides are arranged at both sides of a main optical linear waveguide using a directional coupler, according to another embodiment of the present invention.

Referring to FIG. 2, branched waveguides are coupled to a main optical waveguide to obtain 1/N of input optical power, and then each slanting waveguide transmits the 1/N optical power to each output optical waveguide. The angle between the main waveguide and the slanting waveguide, i.e., a branched angle, may be greater than in a 1×N optical power splitter as discussed above. This is because the branched waveguides are not followed by a new branching stage and thus the direction in which optical waves propagate on the equi-phase plane does not need to be the same as the propagation direction for the slanting optical waveguides. Instead, the branched angle is determined to keep scattering losses at a branching point within an allowable level. FIG. 3 shows an example of an optical power splitter whose length is reduced by arranging branched waveguides on both sides of the main optical waveguide. The branched optical waveguides are alternately coupled to the right and left sides of the main optical waveguide, so that the distance between the output optical waveguide of a first directional coupler and the main optical waveguide is half that of the splitter of FIG. 2. Thus, the length of the optical power splitter is reduced.

The two optical power splitters of FIGS. 2 and 3 each have a main linear optical waveguide. However, a circular substrate is usually used to manufacture the optical power splitter, thus making it difficult to effectively use such a substrate in some cases. Particularly, in the case of a great number of branched optical waveguides, the device is very long, which makes it difficult to utilize the edge portion of the circular substrate.

Figure 4:
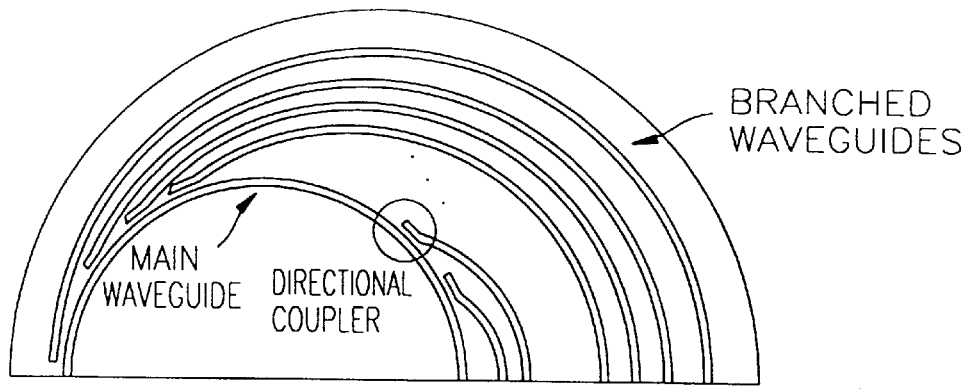
FIG. 4 shows a 1×N optical power splitter in which branched optical waveguides are arranged at one side of a main optical semi-circular waveguide using a directional coupler, according to still another embodiment of the present invention.
Figure 5:
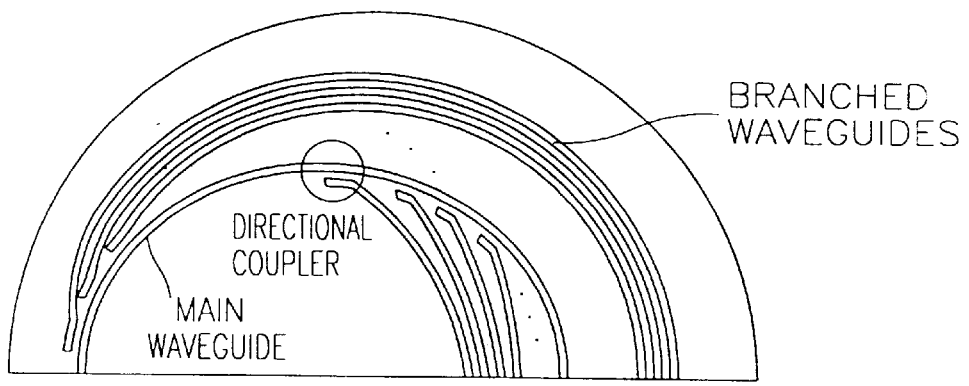
FIG. 5 shows a 1×N optical power splitter in which branched optical waveguides are arranged at both sides of a main optical semi-circular waveguide using a directional coupler, according to yet another embodiment of the present invention.

In the present invention, optical power splitters of FIGS. 4 and 5 are provided to effectively use the circular substrate. The optical power splitters shown in FIGS. 4 and 5 sufficiently utilize a half of the circular substrate. Also, an input and output mirror-surface finishing can be performed only one time since an input and an output are on the same side. The optical power splitter of FIG. 4 is a circular version of FIG. 2. (N−1) branched optical waveguides are coupled to the outer side of a semicircular main optical waveguide using a directional coupler, to split optical power. The alignment of branched optical waveguides on both sides of the main semicircular waveguide to more effectively use the circular substrate is shown in FIG. 5. Here, branched optical waveguides having a large radius of curvature can be arranged on the outer side of the main semicircular optical waveguide, but waveguides having a small radius of curvature must be arranged on the inner side thereof on account of a narrow space. FIG. 5 shows an optical power splitter which considers scattering losses and propagation losses depending on the length of the branched optical waveguide. Long branched optical waveguides having a large radius of curvature are provided on the outer side of the main optical waveguide, and short branched optical waveguides having a small radius of curvature are installed on the inner side thereof, such that optical power of equal intensity is output via each output port.

Figure 6:
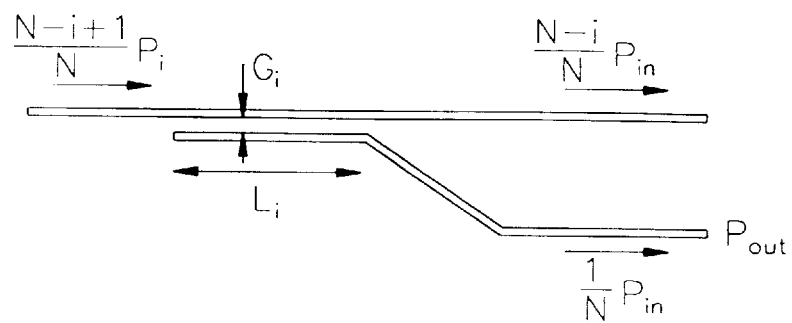
FIG. 6 illustrates the operation of a directional coupler which is applied to the present invention wherein $L_i$ is a coupling length and $G_i$ is a gap, a space or an interval between two waveguides at an ith stage.

FIG. 6 shows the i-th directional coupler of the 1×N optical power splitter to explain the operations of the above proposed four optical power splitters. Referring to FIG. 6, $P_{in}(N-i+1)/N$ indicates an input from the main optical waveguide of the directional coupler, $P_{in}(N-i)/N$ indicates an output to the main optical waveguide, and $P_{in}/N$ indicates an output to the branched optical waveguides. As described above, the directional coupler has phase mismatch to increase a fabrication tolerance. The output characteristics of the directional coupler is expressed by the following Equation 2:

$$P_{out} = P_{in} \cdot \frac{K_{(ab)i} K^*_{(ba)i}}{K_{(ab)i} \cdot K^*_{(ba)i} + \delta_i^2} \sin^2\left(\sqrt{K_{(ab)i} \cdot K^*_{(ba)i} + \delta_i^2} \cdot L_i\right) \quad (2)$$

wherein $P_{in}$ is an input optical power, $K_i$ is a coupling coefficient, $\delta$ is a propagation constant difference corresponding to a phase mismatch amount, and * is a complex conjugate. As can be seen from Equation 2, a maximum coupled power is determined by the coupling coefficient and the phase mismatch amount. The above Equation 2 is applied to the directional coupler of FIG. 6, thereby obtaining the following Equations 3 through 5:

phase mismatch amount: $\delta_i = \delta_0 \, i=1,2,3,\ldots N-1$ \quad (3)

coupling coefficient: $K_i = \dfrac{\delta_0}{\sqrt{N-i}}$ \quad $i = 1, 2, 3, \ldots, N-1$ \quad (4)

coupling length: $L_i = \dfrac{\pi}{2\delta_0} \cdot \dfrac{\sqrt{N-i}}{\sqrt{N-i+1}}$ \quad $i = 1, 2, 3, \ldots, N-1$ \quad (5)

It can be seen from the above equations that optical power of $P_{in}/N$ can be transferred from the main optical waveguide by fixing the phase mismatch amount to a predetermined value and changing the coupling coefficient and the coupling length at each directional coupler stage. The process for manufacturing a 1×N optical power splitter will now be described.

First, the structures (e.g., refractive index, width and length) of two optical waveguides of the directional coupler are determined.

The phase mismatch amount is calculated by determining the structures of the two optical waveguides. Immediately after the phase mismatch amount is determined, $K_i$ at an i-th stage is determined, thereby determing the space between two optical waveguides. Here, a crosstalk given from superposition between the guided modes of the two optical waveguides must be significantly smaller than $P_i/N$. In this way, the phase mismatch amount must be determined by considering even the cross-talk at the i-th stage. For example, when the phase mismatch amount $\delta_0$ is excessively great, the coupling coefficient $K_i$ becomes great, and the space between adjacent optical waveguides is reduced. The crosstalk increases with a decrease in the space. When the crosstalk is greater than or equal to the $P_i/N$ value, the directional coupler cannot be used as the branched optical waveguides of the 1×N optical power splitter.

Second, the coupling coefficient and the coupling length of the i-th directional coupler is determined.

Third, the space between two optical waveguides of a directional coupler having phase mismatch is determined. As to the coupling coefficient determined at the i-th stage and the structures of the two given optical waveguides, the space between two optical waveguides can be determined from the expression of a coupling coefficient with respect to the space between the optical waveguides. This process has even been used to determine an initial $\delta_0$ in the first process.

Fourth, a main optical waveguide and branched optical waveguides are arranged.

The main optical waveguide and the branched optical waveguides are arranged through the above-described processes. The main optical waveguide selects a narrower optical waveguide among the two optical waveguides, and the branched optical waveguide selects a wider one. The main optical waveguide has a small propagation loss since it is linear, but the branched optical waveguide may have a large propagation loss if it selects a narrower optical waveguide since it has a curved portion. That's why the branched optical waveguide selects a wider optical waveguide.

Fifth, the 1×N optical power splitter is formed by connecting an S-shaped curved optical waveguide to the branched optical waveguide, so that output optical waveguides are spaced at desired intervals. Attention must be paid lest parasitic coupling between the curved optical waveguide and the main optical waveguide should affect the output optical power. For this, it is preferable that an S-shaped curved optical waveguide having a small radius of curvature be used, but in this case, the scattering loss may be increased.

Figure 7:
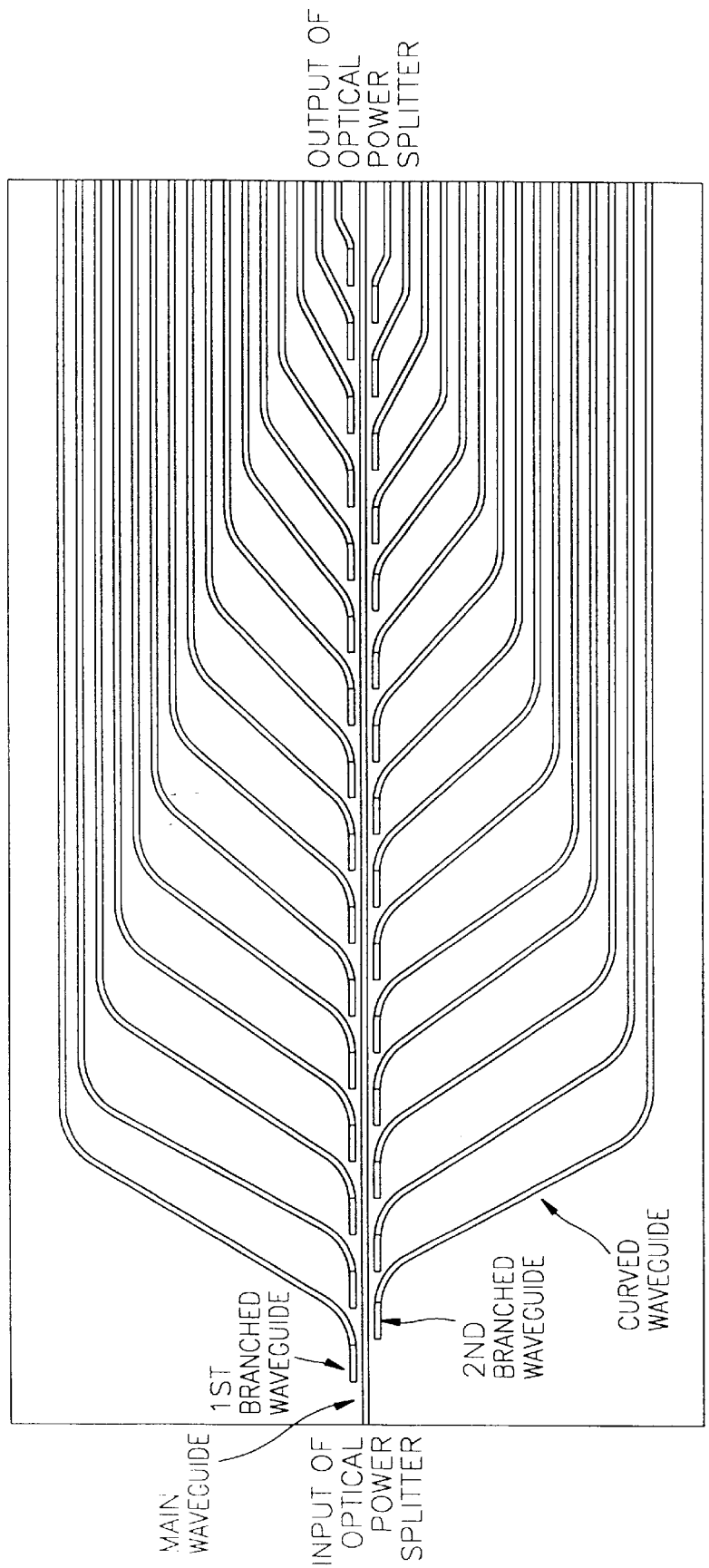
FIG. 7 shows an example of a 1×32 optical power splitter according to the embodiment of FIG.3.

The above is a description of the process for designing the 1×N optical power splitter. Here, the crosstalk and the parasitic coupling are factors which can have a great influence on the performance of the optical power splitter. A basic way to solve the above problem is to determine the coupling coefficient and the coupling length in consideration of these factors. In particular, this problem becomes serious as the number of the output waveguides increases. FIG. 7 shows a 1×32 optical power splitter as an example designed through the aforementioned processes, which was considered to make the crosstalk and the parasitic coupling sufficiently small. The main optical waveguide and the branched optical waveguides applied to the present invention are channel optical waveguides constituted of a multi-layered polymer or silica thin film formed on a silicon wafer. In the narrow main optical waveguide, a wider optical waveguide can be connected to the input and output ports of the main optical waveguide via a tapered waveguide to accomplish an effective coupling with an optical fiber.

The optical power splitter according to the present invention is comprised of a main optical waveguide and (N−1) branched optical waveguides, and they are connected to each other using the structure of the directional coupler. The branched optical waveguide in each directional coupler has an appropriate phase mismatch, a proper coupling coefficient, and a suitable coupling length to output 1/N of the optical power from an input main optical waveguide. This optical power splitter enables effective use of a circular substrate, when the main optical waveguide is semicircular. Thus, in the present invention, a large branched angle can be used, so that the optical power splitter is shortened. Also, uniformity is increased by providing a small ratio of width to length (device length/device width). A fabrication tolerance is increased by using the directional coupler having a phase mismatch to branch the output from the main optical waveguide. Thus, uniformity of the outputs is ensured. The directional coupler having the phase mismatch reduces an optical output variation with respect to a variation in external operation conditions, thus increasing the uniformity of outputs. The 1×N optical power splitter is constituted only by designing (N−1) directional couplers, thus reducing the costs for designing the device. That is, since the devices are configured in a star structure, a defect generated on one portion of the optical waveguide slightly affects the uniformity if the defective portion is not a branching point of a optical wave. Thus, an yield can be improved. In a modification, optical waveguides are arranged in a semi-circle shape to effectively use a circular substrate.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. In a 1×N optical power splitter, N being a positive integer, comprising a main optical waveguide and (N−1) branched optical waveguides branched from the main optical waveguide, the main optical waveguide and the branched optical waveguides being coupled to each other in a structure of a directional coupler to form an end of the main optical waveguide as an input port and the other end thereof as an output port and to form an end of each of the branched optical waveguides as an input port branched from the main optical waveguide and the other end thereof as another output port;

the improvement comprising: said directional coupler having means for reducing scattering losses and for making an equal division ratio.

2. The 1×N optical power splitter as claimed in claim 1, wherein said means comprises selection of phase mismatch, coupling coefficient, and coupling length in a manner such that the scattering losses are reduced and the division ratio is equalized.

3. The 1×N optical power splitter as claimed in claim 2, the branched optical waveguides respectively constitute output optical waveguides, each branched optical waveguide being formed of one of a slanting, linear, or S-shaped curved optical waveguide.

4. The 1×N optical power splitter as claimed in claim 1, the main optical waveguide being curved.

5. The 1×N optical power splitter as claimed in claim 4, the branched optical waveguides being arranged on one side of the main optical waveguide.

6. The 1×N optical power splitter as claimed in claim 4, the branched optical waveguides being arranged on both sides of the main optical waveguide.

7. The 1×N optical power splitter as claimed in claim 3, the branched optical waveguides respectively constitute output optical waveguides, each branched optical waveguide being formed of a curved optical waveguide.

8. The 1×N optical power splitter as claimed in claim 4, the main optical waveguide being semicircular.

9. The 1×N optical power splitter as claimed in claim 8, the N−1 branched optical waveguides being arranged on an outer side of the main optical waveguide.

10. The 1×N optical power splitter as claimed in claim 8, wherein the main optical waveguide and the branched optical waveguides being disposed within half of a circular substrate.

11. The 1×N optical power splitter as claimed in claim 8, half of the branched optical waveguides being arranged on an outer side of the main optical waveguide, and half of the branched optical waveguides being arranged on an inner side of the main optical waveguide.

12. The 1×N optical power splitter as claimed in claim 10, cross-section mirror-surface finishing of the optical power splitter being effected on one surface perpendicular to the main optical waveguide being an input and output optical waveguide.

13. The 1×N optical power splitter as claimed in claim 4, the directional coupler having a degree of phase mismatch ($\delta$) related to a coupling coefficient ($K_i$), such that $$\delta = K_i \sqrt{N-i}.$$

14. The 1×N optical power splitter as claimed in claim 4, the main optical waveguide and the branched optical waveguides being channel optical waveguides each constituted of a multilayered polymer thin film disposed upon a silicon wafer.

15. The 1×N optical power splitter as claimed in claim 4, the main optical waveguide and the branched optical waveguides being channel optical waveguides each constituted of a multilayered silica thin film disposed upon a silicon wafer.

16. A 1×N optical power splitter, N being a positive integer, said power splitter comprising a main optical waveguide and (N−1) branched optical waveguides branched from the main optical waveguide, the main optical waveguide and the branched optical waveguides being coupled to each other in a structure of a directional coupler to form an end of the main optical waveguide as an input port and the other end thereof as an output port and to form an end of each of the branched optical waveguides as an input port branched from the main optical waveguide and the other end thereof as another output port, said directional coupler having a phase mismatch amount ($\delta$), coupling coefficient ($K_i$) and coupling length ($L_i$) of a first directional coupler structure for branching optical power being determined by the following relational expressions:

$$\delta_i = \delta_0 \qquad i = 1, 2, 3, \ldots, N-1$$

$$K_i = \frac{\delta_0}{\sqrt{N-i+1}} \qquad i = 1, 2, 3, \ldots, N-1$$

$$L_i = \frac{\pi}{2} \delta_0 \cdot \frac{\sqrt{N-i}}{\sqrt{N-i+1}} \qquad i = 1, 2, 3, \ldots, N-1.$$

17. The 1×N optical power splitter of claim 16, the phase mismatch amount, the coupling coefficient and the coupling length of an i-th directional coupler when N is large being corrected in consideration of crosstalk and parasitic coupling.

18. A method of manufacturing a 1×N optical power splitter comprising a main optical waveguide and (N−1) branched optical waveguides branched from the main optical waveguide, the main optical waveguide and the branched optical waveguides being coupled to each other in a structure of a directional coupler to form an end of the main optical waveguide as an input port and the other end thereof as an output port and to form an end of each of the branched optical waveguides as an input port branched from the main optical waveguide and the other end thereof as another output port, the method comprising the steps of:

(a) determining refractive indices, widths and lengths of two optical waveguides coupled to each other in the directional coupler structure;

(b) determining coupling coefficient ($K_i$) and coupling length ($L_l$) of the directional coupler structure;

(c) determining a spacing between two optical waveguides of the directional coupler structure having a phase mismatch amount ($\delta$); and (d) arranging the main optical waveguide and the branched optical waveguides using the results determined through steps (a)–(d);

wherein $\delta$, $K_i$, and $L_l$ are selected such that scattering losses are reduced and division ratio is equalized.

19. The method of manufacturing a 1×N optical power splitter as claimed in claim 18, step (d) further comprising the step of forming a 1×N optical power splitter to space output optical waveguides at desired intervals by connecting an S-shaped curved optical waveguide to the main optical waveguide and each of the branched optical waveguides.

20. The method of manufacturing a 1×N optical power splitter as claimed in claim 18, step (d) further comprising the step of forming a 1×N optical power splitter to space output optical waveguides at desired intervals by arranging the main optical waveguide and the branched optical waveguides each in the shape of a semicircle.

21. The method of manufacturing a 1×N optical power splitter as claimed in claim 18, step (a) further comprising the steps of:

(a1) calculating the phase mismatch amount ($\delta$) using the determined structures of two optical waveguides;

(a2) determining the coupling coefficient ($K_i$) using the calculated phase mismatch amount; and (a3) determining the spacing between the two optical waveguides using the determined coupling coefficient;

wherein $$\delta = K_i \sqrt{N-1}.$$

22. The method of manufacturing a 1×N optical power splitter as claimed in claim 21, in step (b), the spacing between the two optical waveguides being determined by the expression of the coupling coefficient with respect to the spacing between optical waveguides in the determined coupling coefficient and the given structures of the two optical waveguides.

23. The method of manufacturing a 1×N optical power splitter as claimed in claim 21, in step (d), the branched optical waveguides being arranged on one side of the main optical waveguide, and the coupling length ($L_i$) such that $$L_i = \frac{\pi}{2\delta_0} \cdot \frac{\sqrt{N-i}}{\sqrt{N-i+1}}.$$

24. The method of manufacturing a 1×N optical power splitter as claimed in claim 23, in step (d), a narrower optical waveguide being selected as the main optical waveguide and a wider optical waveguide being selected as the branched optical waveguide.

25. The method of manufacturing a 1×N optical power splitter as claimed in claim 24, the wider optical waveguide being connected to an input and output port of the narrower main optical waveguide via a tapered waveguide for coupling the main optical waveguide to an optical fiber.

26. The method of manufacturing a 1×N optical power splitter as claimed in claim 21, in step (d), the branched optical waveguides being arranged on both sides of the main optical waveguide.

27. The method of manufacturing a 1×N optical power splitter as claimed in claim 26, in step (d), a narrower optical waveguide being selected as the main optical waveguide and a wider optical waveguide being selected as the branched optical waveguide.

28. The method of manufacturing a 1×N optical power splitter as claimed in claim 27, the wider optical waveguide being connected to an input and output port of the narrower main optical waveguide via a tapered waveguide for coupling the main optical waveguide to an optical fiber.

* * * * *